United States Patent
Kelly

(10) Patent No.: US 8,250,127 B2
(45) Date of Patent: Aug. 21, 2012

(54) HARVESTING ENTROPY FROM TRUSTED CRYPTOGRAPHIC SOURCES

(75) Inventor: Scott Kelly, Santa Clara, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1152 days.

(21) Appl. No.: 11/970,153

(22) Filed: Jan. 7, 2008

(65) Prior Publication Data

US 2010/0023749 A1 Jan. 28, 2010

(51) Int. Cl.
H04L 29/06 (2006.01)
(52) U.S. Cl. ...................................................... 708/250
(58) Field of Classification Search .................. 713/150; 708/250; 380/46
See application file for complete search history.

(56) References Cited

U.S. PATENT DOCUMENTS

| | | | |
|---|---|---|---|
| 5,850,450 A | 12/1998 | Schweitzer et al. | |
| 7,170,997 B2 | 1/2007 | Petersen et al. | |
| 7,209,561 B1 * | 4/2007 | Shankar et al. | 380/262 |
| 7,773,748 B2 | 8/2010 | Urivskiy et al. | |
| 7,894,602 B2 | 2/2011 | Mueller et al. | |
| 7,930,332 B2 | 4/2011 | Acar et al. | |
| 2004/0073797 A1 * | 4/2004 | Fascenda | 713/171 |
| 2006/0067527 A1 | 3/2006 | Urivskiy et al. | |
| 2006/0072747 A1 * | 4/2006 | Wood et al. | 380/44 |
| 2007/0230693 A1 | 10/2007 | Mueller et al. | |
| 2007/0230695 A1 * | 10/2007 | Sefzik et al. | 380/46 |
| 2008/0095153 A1 * | 4/2008 | Fukunaga et al. | 370/389 |
| 2008/0256151 A1 | 10/2008 | Acar et al. | |
| 2008/0282352 A1 * | 11/2008 | Beddoe et al. | 726/25 |

OTHER PUBLICATIONS

Sharon S. Keller, "NIST-Recommended Random Number Generator Based on ANSI X9.31 Appendix A.2.4 Using the 3-Key Triple DES and AES Algorithms", Jan. 31, 2005, 1-4.
Elaine Barker et al., "Recommendation for Random Number Generation Using Deterministic Random Bit Generators" (Revised), Mar. 2007, 1-133.

* cited by examiner

Primary Examiner — Jeffrey D Popham
Assistant Examiner — Tracy Mangialaschi
(74) Attorney, Agent, or Firm — Blakely, Sokoloff, Taylor & Zafman LLP

(57) ABSTRACT

Extending entropy in a random number generation utility. Where a device has access to trusted sources of encrypted data, such as encrypted network traffic, such encrypted network traffic may be sampled and the bits fed into the entropy seeding routines of the random number generation utility.

23 Claims, 2 Drawing Sheets

HARVESTING ENTROPY FROM TRUSTED CRYPTOGRAPHIC SOURCES

BACKGROUND OF THE INVENTION

The present invention relates to the operation of pseudo-random number generators, and more particularly, to managing and extending entropy pools used in pseudo-random number generators.

Pseudo-random numbers are required for many operations in computers, computer networks, and network devices, and are frequently used in security-critical operations such as cryptographic key derivation. Unpredictability of such random or pseudo-random numbers is paramount for such applications.

Such unpredictability may be defined for example, as a low correlation between bits in a pseudo-random bitstream, between portions of the bitstream, or between the pseudo-random bitstream and other signals.

A good random number utility is a carefully designed and vetted subsystem in a computing device. It may be implemented entirely in software, or it may use specialized hardware assists A typical utility operates on an entropy pool, a pool of randomized bits, from which requests for random numbers may be satisfied.

Personal computers typically derive entropy, which may be defined as a numeric quantity which is unpredictable and uncorrelated from a statistical perspective, from various environmental inputs, particularly those affected by the randomness and unpredictability of human operators Such inputs may include the latency between key presses on a keyboard, idiosyncratic mouse timing, variations in network packet arrival, variation in disk drive operation such as seek time variations, and others. Some systems may devote hardware resources to (pseudo-) random number generation. Values from such sources may be "whitened" by running them through a hashing algorithm such as SHA1 or other cryptographic process, and the resulting bits "stirred" into the entropy pool of the random number utility.

Embedded devices, such as network devices and wireless access nodes, often lack hardware random number generators and are often at a loss for sufficient entropy sources, as such devices do not have unpredictable users, keyboards, mice, disk drives, and the like. Often the "best" response in such devices is to add a hardware generator and use this generator to periodically re-seed the entropy pool used by the random number utility.

What is needed is a way of adding entropy, particularly in embedded systems.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to extending entropy in random number generation. In an embodiment of the invention, trusted sources of encrypted data, such as encrypted network traffic, are sampled and fed to the entropy seeding routines of the random number generation utility such that the extracted data is stirred into the entropy pool of the random number utility.

Figure 1:
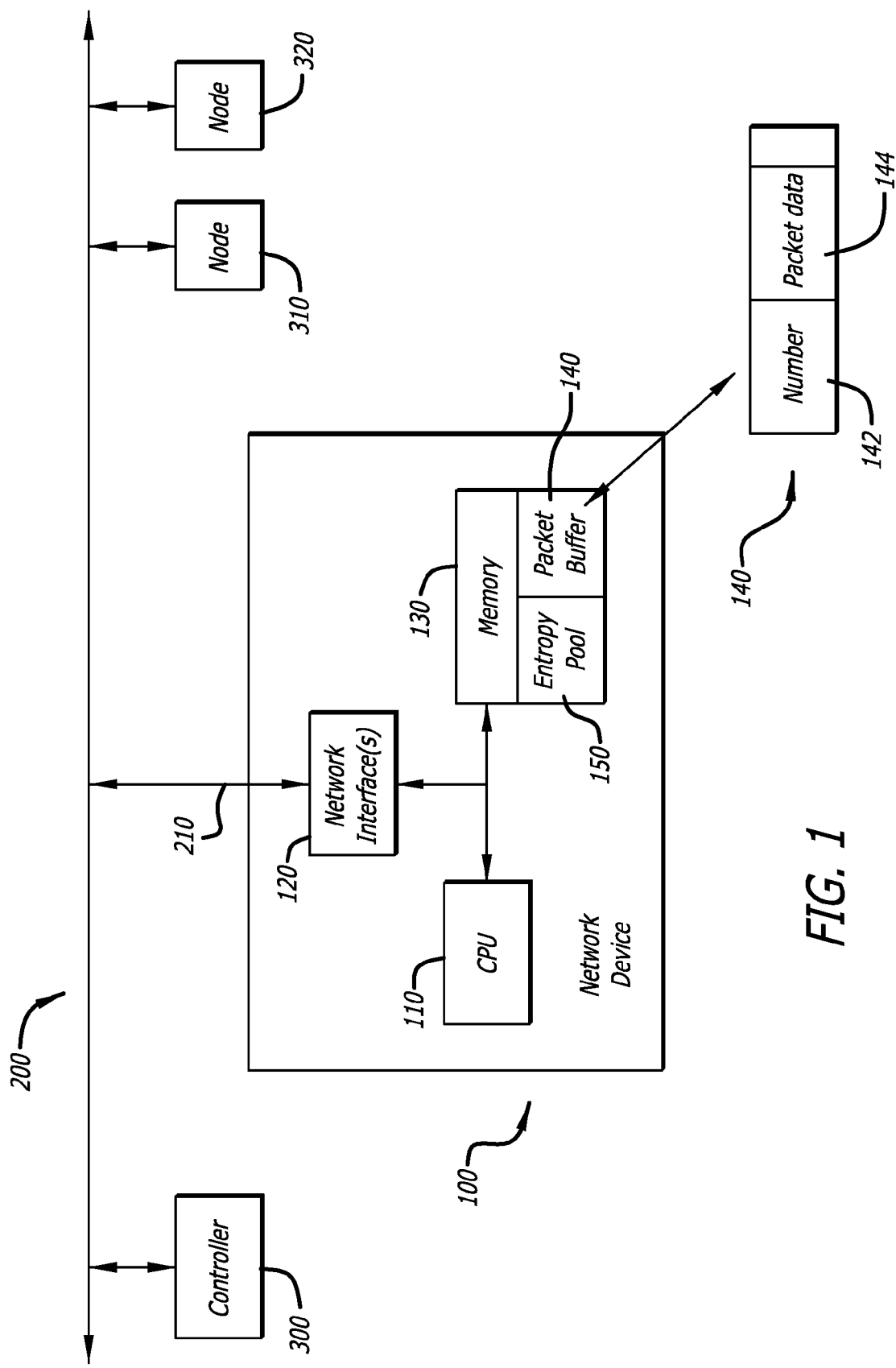
FIG. 1 shows a network device operating in a network.

FIG. 1. shows an environment suitable for practicing the invention. Network device 100 connects 210 to network 200. Network 200 may be a wired or a wireless network such an Ethernet network operating under known IEEE 803.2 or 802.11 standards. Device 100 operates under control of central processing unit (CPU) 110, which controls one or more network interfaces 120, and operates in conjunction with memory hierarchy 130. In one embodiment, CPU 110 is a MIPS-class CPU such as those from Cavium or Raza. CPUs from other manufacturers, such as Intel, AMD, ARM, or the like may also be used. Network interface 120 may be one or more wired or wireless interfaces. Wired interfaces conforming to IEEE 803.2 standards may be used, or wireless networks conforming to IEEE 803.11 standards. Memory hierarchy 130 as understood by the art holds instructions and data necessary for practicing the invention on machine readable media and typically comprises a small amount of permanent storage for system initialization, fast read-write storage such as DRAM, and bulk storage such as Compact Flash for storing files.

Network 200 is populated by other network devices such as controller 300 and nodes 310 and 320. Nodes 310 and 320 may be other network devices, or they may be peer nodes, such as peers to node 100 in a mesh network.

As understood by the art, such a hardware platform as shown in FIG. 1. operates under the control of an embedded operating system, which may be a LINUX derivative, or other suitable operating system for embedded devices.

If suitable encryption keys are used, the output of robust encryption algorithms is effectively random. According to the present invention, if a device has access to a source of encrypted data, that encrypted data may be sampled and fed into the entropy seeding routines of the random number generation utility, stirring the data into the entropy pool.

A network device 100 such as an access node, switch, or mesh point, has access to multiple trusted sources of encrypted data in the form of encrypted datastreams available to or passing through the device.

When such a device is locally terminating sessions encrypted using WPA or WPA2 protocols, the device is encrypting packets destined for clients, and can sample bits from such packets, When encryption over the network is centrally terminated, for example at a controller and the encrypted traffic tunneled, a device such as an access node decapsulates the encrypted IEEE 802.11 frames and forwards them over the air; such encrypted 802.11 frames can be sampled.

Mesh nodes involved in forwarding traffic may recognize elements of such traffic as encrypted, and can sample bits from such traffic.

For the purposes of the invention, trusted encrypted packets include those packets which are encrypted by the device itself, or packets which originate from a trusted source, which can include encrypted traffic from peers or controllers which can be trusted not to behave in a malicious manner, and encrypted traffic for which the device holds decryption keys.

Alternatively, encrypted packets may be developed by taking network packets, which may be encrypted packets, and applying further encryption to such packets. In one embodiment, an access node may use a session key from another session to encrypt a packet, producing a packet suitable for use by the invention.

Figure 2:
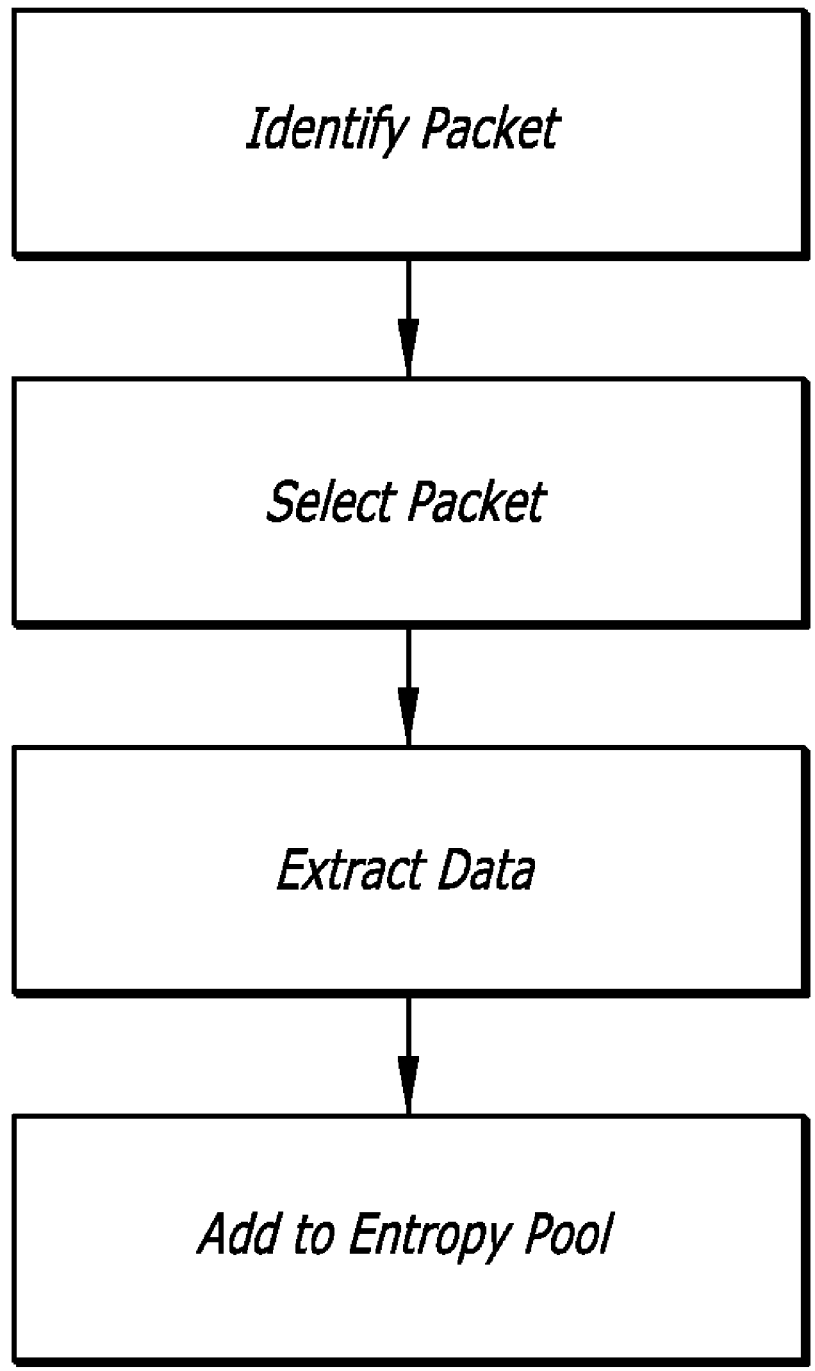
FIG. 2 shows a flowchart of the invention.

In accordance with an embodiment of the invention and as shown in the flowchart of FIG. 2, a network device recognizes encrypted network traffic and samples bits from such network packets 144, feeding such bits to the entropy seeding routines of the random number utility and its entropy pool 150.

As shown in FIG. 1, packet buffer 140 in memory 130 typically contains packet header data 142, such as TCI/IP headers, and packet data 144. Other encapsulating data, such as Ethernet headers and trailers, are not shown. Packet data 144, which has been identified as encrypted data, is sampled, and added to entropy pool 150.

For the purpose of description herein, it is assumed that the random number utility has an entropy pool, a mechanism for adding or stirring bits into the entropy pool, and a mechanism for returning random bits based on the entropy pool. The nature of these mechanisms will depend necessarily on the computer languages and structures used for their implementation. Such utilities are described, for example, in ANSI X9.31 Appendix A.2.4, or NIST Special Publication (SP) 800-90, incorporated herein by reference.

Such sampling may be event based, as an example, controlled by a timer, or triggered by a low-water mark on the entropy pool. Sampling may take place on a periodic basis, Sampling may also take place on a stochastic basis. As an example, when encrypted data is recognized, the decision on whether or not to sample that packet is made on the basis of a random number from the random number utility. In one embodiment, a random bit is requested from the random number utility, and if this random bit is a "1" then the packet is sampled, and if "0" the packet is not sampled.

When the decision has been made to sample a packet, either a fixed or a variable portion of encrypted data 144 from the packet may be sampled. In one embodiment, a fixed amount of encrypted packet data starting at a fixed offset from the beginning of packet data 144 is selected and added to the entropy pool. As an example, the offset may be zero, and the entire encrypted packet 144 may be selected and added to the entropy pool. Or, a single byte or fixed number of bytes may be selected and added.

In another embodiment, an offset and length are chosen stochastically, using random numbers from the random number utility. A random number (a number of bits) is requested for an offset into encrypted packet 144 and a random number is requested for the length (number of bits or bytes) to select from encrypted packet 144. The offset should be calculated modulo the packet size, The length should also be calculated modulo the packet size. If the offset plus the length is greater than the length of encrypted packet 144, then the length may be truncated, or data may be sampled from encrypted packet 144 in a circular fashion. The selected data from encrypted packet 144 is then added to the entropy pool.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method of adding entropy to an entropy pool of a random number generator in a network connected device, the method comprising:
    identifying a first packet of network data as encrypted;
    selecting the first packet for use;
    extracting a variable amount of data from the first packet, the extracting includes generating a first random number indicating an offset into the first packet, generating a second random number indicating a length, and extracting data from the first packet starting at the offset generated and for the length generated;
    stirring the extracted data into the entropy pool of the random number generator;
    selecting a second packet for use from the encrypted network data;
    extracting a variable amount of data from the second packet different than the variable amount of data extracted from the first packet, the extracting includes generating a third random number indicating an offset into the second packet, generating a fourth random number indicating a length, and extracting data from the second packet starting at the offset generated and for the length generated; and
    stirring the extracted data from the second packet into the entropy pool of the random number generator.

2. The method of claim 1 wherein the network is a wired network.

3. The method of claim 2 wherein the wired network operates according to IEEE 802.3 standards.

4. The method of claim 1 wherein the network is a wireless network.

5. The method of claim 4 wherein the wireless network operates according to IEEE 802.11 standards.

6. The method of claim 1 wherein selecting of the first packet for use further comprises selecting a packet on a periodic basis.

7. The method of claim 1 wherein the selecting of the first packet for use further comprises sampling the first packet based on a random number.

8. The method of claim 1 wherein the stifling of the extracted data comprises loading the extracted bits into an entropy seeding module of a random number utility executed by a processor implemented within the network connected device.

9. The method of claim 1 wherein the offset and length are used modulo the packet size.

10. The method of claim 1 wherein the first identified packet of network data has been re-encrypted.

11. The method of claim 1 wherein the first identified packet of network data is from a peer node.

12. The method of claim 1 wherein the first identified packet of network data is from a controller.

13. A non-transitory machine readable medium having a set of instructions stored therein, which when executed on a network connected device cause a set of operations to be performed comprising:
    identifying a first packet of network data as encrypted;
    selecting the first packet for use;
    extracting a variable amount of data from the first packet, the extracting includes generating a first random number indicating an offset into the first packet, generating a second random number indicating a length, and extracting data from the first packet starting at the offset generated and for the length generated;
    stirring the extracted data into an entropy pool of the random number generator;
    identifying a second packet of the encrypted network data;
    extracting a variable amount of data from the second packet, the amount of data extracted from the second packet being different from the amount of data extracted from the first packet, the extracting includes generating a third random number indicating an offset into the second packet, generating a fourth random number indicating a length, and extracting data from the second packet starting at the offset generated and for the length generated; and
    stirring the extracted data from the second packet into the entropy pool of the random number generator.

14. The non-transitory machine readable medium of claim 13 wherein the network is a wired network operating according to IEEE 802.3 standards.

15. The non-transitory machine readable medium of claim 13 wherein the network is a wireless network operating according to IEEE 802.11 standards.

16. The non-transitory machine readable medium of claim 13 wherein the selecting the first packet for use further comprises selecting a packet on a periodic basis.

17. The non-transitory machine readable medium of claim 13 wherein the selecting of the first packet for use further comprises selecting a packet depending on a random number.

18. The non-transitory machine readable medium of claim 13 wherein the extracting of the data from the first packet further comprises selecting a fixed amount of data from a fixed position in the first packet.

19. The non-transitory machine readable medium of claim 13 wherein the offset and length are used modulo the packet size.

20. The non-transitory machine readable medium of claim 13 wherein the identified first packet of network data has been re-encrypted.

21. The non-transitory machine readable medium of claim 13 wherein the identified first packet of network data is from a peer node.

22. The non-transitory machine readable medium of claim 13 wherein the identified first packet of network data is from a controller.

23. A method of adding entropy to an entropy pool of a random number generator in a network connected device, the method comprising:
- identifying a first packet of network data;
- selecting the first packet for use;
- extracting a variable amount of data from the first packet, the extracting includes generating a first random number indicating an offset into the first packet, generating a second random number indicating a length, and extracting data from the first packet starting at the offset generated and for the length generated;
- stirring the extracted data into the entropy pool of the random number generator;
- selecting a second packet for use from the network data;
- extracting a variable amount of data from the second packet different than the variable amount of data extracted from the first packet, the extracting includes generating a third random number indicating an offset into the second packet, generating a fourth random number indicating a length, and extracting data from the second packet starting at the offset generated and for the length generated; and
- stirring the extracted data from the second packet into the entropy pool of the random number generator.

* * * * *